July 4, 1933. G. D. ATWOOD 1,916,712
RECEPTACLE FOR MATERIAL CARRYING SPOOLS
Filed June 4, 1930
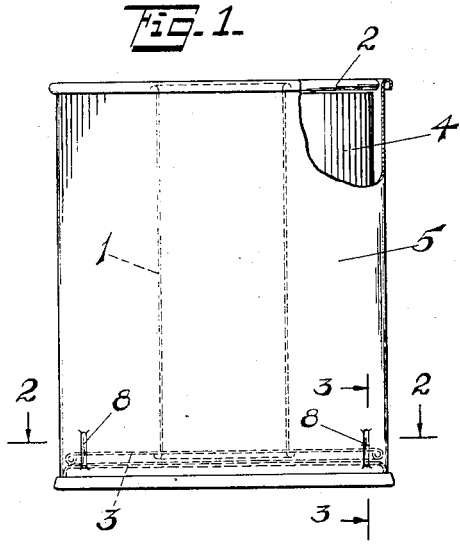
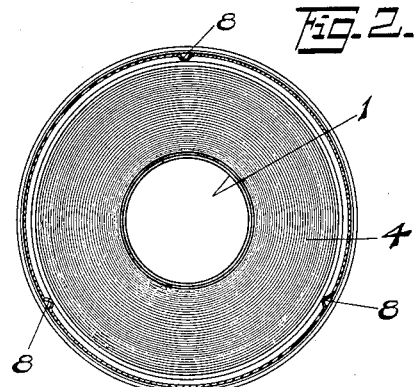
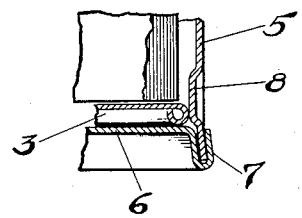
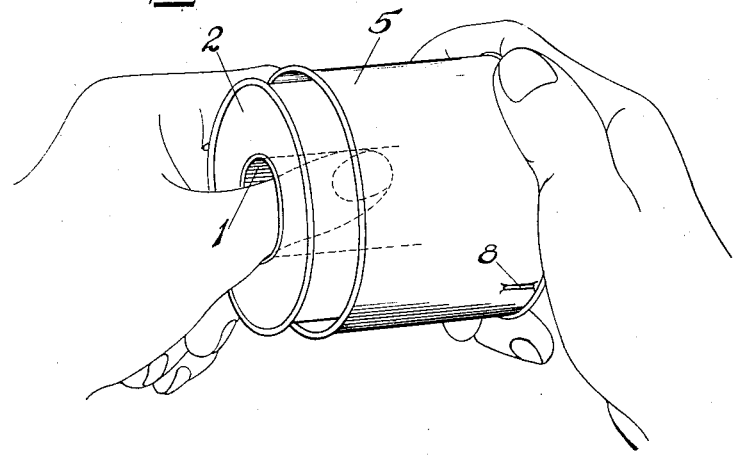
Inventor
George D. Atwood
By his Attorneys Patented July 4, 1933

1,916,712

UNITED STATES PATENT OFFICE

GEORGE D. ATWOOD, OF BROOKLYN, NEW YORK

RECEPTACLE FOR MATERIAL-CARRYING SPOOLS

Application filed June 4, 1930. Serial No. 459,225.

This invention relates to improvements in receptacles for spools bearing windings of surgical adhesive tape, gauze and other material, which, for hygienic and various other reasons, must or should be protected from the dust and impurities of the atmosphere and yet be readily removable, with its contents, from the receptacle and be as readily returned thereto as the material is unwound and severed for use.

In the accompanying drawing,—

Figure 1 is a side elevation, partly broken away, illustrating a receptacle embodying the present invention and a flanged spool with its winding of material thereon;

Figure 2 is a cross-section thereof on the line 2—2 of Figure 1;

Figure 3 is an enlarged vetrical section on the line 3—3 of Figure 1 illustrating the means provided in the receptacle for engaging the spool and holding or locking it in the receptacle; and Figure 4 is a perspective view of the receptacle and spool showing the manner in which the latter is disengaged from and removed from the receptacle.

In said drawing 1 represents a sheet metal barrel and 2, 3, the annular sheet metal flanges of a spool, barrel 1 having wound upon it tape-like material 4, such, for example, as surgical adhesive tape.

The receptacle for the spool comprises a casing 5, which is preferably but not necessarily provided with a bottom plate 6 having a flanged portion 7 in which the lower end of the casing is secured in any suitable manner.

The inner diameter of the casing 5 is slightly larger than that of the flanges 2, 3, so that the fit between the spool and casing is a loose one except for the means in the casing for engaging and holding the spool in the receptacle. This holding means consists of a plurality of inwardly pressed projections 8 near the bottom of the casing and extending longitudinally thereof and of such length that, while the spool is being introduced into and also when it reaches the bottom of the casing they will, as best shown in Figure 3, frictionally engage the inner flange 3 of the spool and thereby hold the spool securely against accidental displacement in or removal from the receptacle.

As before stated, the diameter of the casing 5 is slightly greater than that of the spool flanges. This provides for a slight rocking movement of the spool at its outer end in the casing, thus facilitating the disengagement of flange 3 from the projections 8 and the removal of the spool from the casing, from time to time, as access to the spool is desired for the purpose of removing some of the material wound upon it.

For the purpose of enabling the spool to be so rocked easily, the opening in barrel 1, and therefore in the annular flanges 2, 3, is made sufficiently large for the reception of a thumb or finger of the hand and the application by it there of sidewise pressure to the spool as shown in Figure 1.

What is claimed is:

1. A sheet metal receptacle for a material-carrying spool having annular flanges at its ends, said receptacle comprising a casing provided at or near its lower end with a plurality of inwardly-pressed projections extending longitudinally of the casing and frictionally engaging the outer edge of the inner flange of the spool during and on completion of the inward movement of the spool, whereby the spool is frictionally locked to the casing at that flanged end, the outer end of the receptacle being of larger diameter than the outer flange of the spool whereby the spool may be rocked sidewise at its outer end to facilitate its disengagement from said projections and the pulling thereof from the receptacle.

2. A sheet metal receptacle for a material-carrying spool having annular flanges at its ends, said receptacle comprising a casing provided at or near its lower end with a plurality of inwardly-pressed projections frictionally engaging the outer edge of the inner flange of the spool during and on completion of the inward movement of the spool, whereby the spool is frictionally locked to the casing at that flanged end, the outer end of the receptacle being of larger diameter than the outer flange of the spool whereby the spool may be rocked sidewise at its outer end by finger pressure applied inside the annular flange opening at that end to facilitate its disengagement from said projections and the pulling thereof from the receptacle.

3. A sheet metal receptacle for a material-carrying spool having annular flanges at its ends, said receptacle comprising a casing having a closed bottom on which the inner flange of the spool rests on the completion of the inward movement of the spool and provided with a plurality of inwardly-pressed projections extending longitudinally of the casing from the bottom thereof and frictionally engaging the outer edge of the inner flange of the spool during and on completion of the inward movement of the spool, whereby the spool is frictionally locked to the casing at that flanged end, the outer end of the receptacle being of larger diameter than the outer flange of the spool whereby the spool may be rocked sidewise at its outer end to facilitate its disengagement from said projections and the pulling of it from the receptacle.

In testimony whereof, I have hereunto set my hand.

GEORGE D. ATWOOD.